US006999502B1

(12) United States Patent
Boulanger et al.

(10) Patent No.: US 6,999,502 B1
(45) Date of Patent: Feb. 14, 2006

(54) METHOD FOR RECEIVING CDMA SIGNALS WITH SYNCHRONIZATION RESULTING FROM DELAYED DOUBLE MULTIPLICATION AND CORRESPONDING RECEIVER

(75) Inventors: Christophe Boulanger, Ivry-sur-Seine (FR); Jean-René Lequepeys, Fotaine (FR); Bernard Piaget, Venon (FR); Roselino Lionti, Seyssins (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/786,275

(22) PCT Filed: Sep. 3, 1999

(86) PCT No.: PCT/FR99/02102

§ 371 (c)(1),
(2), (4) Date: Apr. 5, 2001

(87) PCT Pub. No.: WO00/14891

PCT Pub. Date: Mar. 16, 2000

(30) Foreign Application Priority Data

Sep. 4, 1998 (FR) .................................. 98 11087

(51) Int. Cl.
*H04B 1/707* (2006.01)

(52) U.S. Cl. ...................... 375/150; 375/142; 375/152; 375/330; 375/331

(58) Field of Classification Search ................ 375/150, 375/147, 354, 364, 325, 137, 331, 152, 130, 375/341, 133, 140, 142, 143, 330; 370/203, 370/330; 369/44.26; 708/320, 318
See application file for complete search history.

(56) References Cited

U.S. PATENT DOCUMENTS

| | | | | |
|---|---|---|---|---|
| 5,400,359 | A * | 3/1995 | Hikoso et al. | 375/133 |
| 5,588,026 | A * | 12/1996 | Ishikawa et al. | 375/329 |
| 6,115,413 | A * | 9/2000 | Lattard et al. | 375/130 |
| 6,349,109 | B1 * | 2/2002 | Lattard et al. | 375/140 |

FOREIGN PATENT DOCUMENTS

| | | |
|---|---|---|
| EP | 0 562 529 | 9/1993 |
| EP | 0 630 120 | 12/1994 |
| EP | 0 726 658 | 8/1996 |
| EP | 0 854 586 | 7/1998 |

OTHER PUBLICATIONS

On the implementation and performance of single and double differential detection schemes, Simon M. K.; Divsalar, D.; Communications, IEEE Transactions on, vol.: 40, Issue: 2, Feb. 1992 pp.: 278-291.*
Multiple differential detection of continuous phase modulation signals, Makrakis, D.; Feher, K.; Vehicular Technology, IEEE Transactions on, vol.: 42, Issue: 2, May 1993, pp.: 186-196.*

* cited by examiner

*Primary Examiner*—Stephen Chin
(74) *Attorney, Agent, or Firm*—Oblon, Spivak, McClelland, Maier & Neustadt, P.C.

(57) ABSTRACT

The present invention relates to a method for receiving CDMA signals with synchronization being obtained through double delayed multiplication, and an associated receiver.

According to the invention, the correlation signal undergoes double delayed multiplication. Synchronization is established on the signal thus generated.

Applied to digital communications, in particular with mobile phones.

4 Claims, 4 Drawing Sheets

METHOD FOR RECEIVING CDMA SIGNALS WITH SYNCHRONIZATION RESULTING FROM DELAYED DOUBLE MULTIPLICATION AND CORRESPONDING RECEIVER

TECHNICAL FIELD

The present invention relates to a method for receiving CDMA signals with synchronization being obtained through double delayed multiplication, and an associated receiver.

The acronym CDMA means "Code Division Multiple Access" and refers to a digital communications technique wherein several users use the same communications channel by means of a special allocation of pseudo-random sequences (or codes).

PRIOR ART

The CDMA technique has been widely described in literature. In this respect, the following general books can be looked up:

Andrew J. VITERBI: "CDMA-Principles of Spread Spectrum Communication" Addison-Wesley Wireless Communications Series, 1975, John G. PROAKIS: "Digital Communications" McGraw-Hill International Editions, 3rd edition, 1995.

It is also possible to look up patent documents issued by the applicant, and in particular: FR-A-3 712 129, FR-A-2 742 014, and FR-A-2 757 333.

The techniques described in these documents implement a signal theory that can be summed up briefly for better understanding of the invention. A pulse carrier w is considered, phase-modulated by a time function P(t). The modulated signal can be written as:

$$s(t)=A(t)\cos\ [wt+P(t)]$$

where A(t) is signal amplitude.

This expression can be expanded to become:

$$s(t)=A(t)\cos\ wt\ \cos\ P(t)-A(t)\sin\ wt\ \sin\ P(t)$$

In designating part A(t)cos P(t), which is in phase with the carrier, as I(t) and part A(t)sin P(t), which is in quadrature therewith, as Q(t), this signal can also be written like this:

$$s(t)=I(t)\cos\ wt-Q(t)\sin\ wt$$

Processing of signal s(t) can thus be done by double processing of parts I(t) and Q(t) which will be designated more simply as I and Q hereafter.

Receivers processing such signals generally receive such signals I and Q at two distinct inputs. They are obtained by multiplying the receive signal by a wave either in phase with the carrier, or in quadrature therewith. The circuits then perform various processing operations depending on the modulations used. Thus, for differential phase modulation, processing consists in calculating the sum and the difference of delayed or undelayed sample products, e.g. $(I_kI_{k-1}+Q_kQ_{k-1})$ and $(Q_kI_{k-1}-I_kQ_{k-1})$, where k designates sample rank.

The first expression is a so-called "DOT" expression and the second one a "CROSS" expression. The DOT signal allows phase displacement between two successive symbols to be determined, whereas DOT and CROSS signals considered together allow to determine the integer times $\pi/2$ of the phase displacement between successive symbols. The DOT and CROSS signals considered together allow to determine the integer times $\pi/2$ of the phase displacement between successive symbols. These DOT and CROSS signals thus enable correct and unambiguous demodulation when differential phase modulation has been used at the transmitter.

Documents FR-A-2 742 014 or FR-A-2 757 330 describe a receiver implementing this technique. This receiver is represented in the appended. FIG. 1. It comprises two similar channels, one phase processing component I and the other quadrature processing component Q. The first channel has a first means 10(I) for fulfilling a filter function suitable for the pseudo-random sequence used at the transmitter, and a delay means 12(I). Like the first one, the second channel comprises a second means 10(Q) for fulfilling a filter function suitable for said pseudo-random sequence, and a delay means 12(Q).

The circuit also comprises a binary multiplier 14 having:

two first inputs, one connected to the output of the first digital filter means 10(I) and receiving a first filtered signal $I_k$, and the other one connected to the output of the first means for fulfilling the delay function 12(I) and receiving a first filtered-delayed signal $I_{k-1}$, two second inputs, one connected to the output of the second filter means 10(Q) and receiving a second filtered signal $Q_k$, and the other one connected to the output of the second means for fulfilling the delay function 12(Q) and receiving a second filtered-delayed signal $Q_{k-1}$, a means for calculating the two direct products between filtered signals and filtered-delayed signals of the first and second channels, i.e. $I_kI_{k-1}$, and $Q_kQ_{k-1}$, and the two crossproducts between the filtered signal of one channel and the filtered-delayed signal of the other channel, i.e. $Q_kI_{k-1}$, and $I_kQ_{k-1}$, a means for calculating the sum of the direct products, i.e. $DOT_k=I_kI_{k-1}+Q_kQ_{k-1}$ and the difference of the crossproducts, i.e. $CROSS_k=Q_kI_{k-1}-I_kQ_{k-1}$.

The circuit described in the above-mentioned documents also comprises a clock integration and regeneration circuit 16 receiving the sum of the direct products and the difference of the crossproducts.

Finally, this circuit comprises a digital programming means 18 containing information for programming, in particular the first and second filter means 10(I), 10(Q).

FIGS. 3, 4, and 5 of the document FR-A-2 757 330 mentioned above show the appearance of the DOT and CROSS signals for differential phase shift keying (DPSK) or differential quadrature phase shift keying (DQPSK). These are peaks marked either positive or negative, according to the circumstances.

In such receivers, synchronization, which allows information data to be located in the filtered signal, is one of the basic operations. It is carried out by following the DOT and/or CROSS signal peaks and determining the time when these peaks cross a maximum. Document FR-A-2 742 014, already mentioned, describes a circuit substantially comprising a comparator, a register and a counter, a means allowing to generate a pulse the leading edge of which is set on the peak received. This pulse is the synchronization signal.

The circuit of FIG. 1 can be slightly modified, as illustrated in FIG. 2, by adding a mean calculation circuit 22. In FIG. 2, the oval circuit 14 is supposed to symbolize delayed sample multiplication, i.e. multiplying one sample by the conjugate preceding sample. Value $T_b$ is the duration of one information bit (or symbol).

Circuit 20 is a circuit searching for the maximum of $|DOT_k|$ and $|CROSS_k|$, and circuit 22 is a circuit calculating an average. An example of this circuit is represented in FIG. 3. It comprises a multiplier 23, a $\frac{1}{2}^m$ gain circuit 24, a delay circuit 25 of quantity $T_b$ corresponding to the duration of one data bit, and a $2^m-1$ gain circuit 26 closing on multiplier 23.

If X(n) designates the input signal and Y(n) the output signal:

$$Y(n) = X(n-1)xY(n-1)\frac{2^m-1}{2^m}$$

is obtained, where m is a variable factor. The signal Y(n) is the final synchronization signal.

This receiving method and associated receivers, although being satisfactory in some respects, still lead to a certain risk of error in the information restored, which can be measured by a so-called bit error rate (BER) quantity.

It is precisely an object of the present invention to overcome this drawback by reducing this rate at the expense of minor modifications.

According to the invention, this improvement is obtained by implementing a so-called double delayed multiplication technique found in a specific type of detection, i.e. double differential detection. Double differential detection known in radio transmissions, in particular in satellite transmissions. However, it is only used for decoding information and not for synchronization. It is described, e.g. in the article by M. K. SIMON and D. DIVSALAR titled "On the Implementation and Performance of Single and Double Differential Detection Schemes" published in the magazine "IEEE Transactions on Communications", vol. 40, no. 2, February 1992, pages 278–291.

The appended FIG. 4 recalls the principle of this double differential detection. The diagram represents a transmitter E and a receiver R. Inside transmitter E, there is substantially a first multiplier associated with a first delay circuit 32 of a duration equal to the duration of symbols to be transmitted, as well as a second multiplier 34 associated with a second delay circuit 36. At the receiver side R, there are similar means, i.e. a first multiplier 40 associated with a first delay circuit 42 as well as a second multiplier 44 associated with a second delay circuit 46. These means perform symmetrical information encoding and decoding. Data is encoded so that after decoding, decision making is independent of Doppler noise, as explained in the above-mentioned article.

It must also be stressed that this technique is not about synchronization but only encoding/decoding.

The present invention recommends the principle of double delayed multiplication to be used for improving the quality of synchronization. Moreover, the invention is part of CDMA, assuming information symbols to be spectrum spread by pseudo-random sequences, which is a field very far away from radio transmissions.

SUMMARY OF THE INVENTION

Precisely, the object of this invention is a method for receiving a CDMA signal, comprising an operation of correlation with appropriate pseudo-random sequences, an operation of synchronization for locating data within the correlation signal obtained, and a data retrieval operation, this method being characterized in that the synchronization operation implements double delayed multiplication of the correlation signal.

Also, an object of the invention is a CDMA receiver, comprising:

- correlation means functioning with appropriate pseudo-random sequences, and delivering a correlation signal,
- synchronization means for delivering a synchronization means locating data in the correlation signal,
- decoding means for retrieving the data, this receiver being characterized in that the synchronization means is a correlation signal double delayed multiplication means.

DESCRIPTION OF SPECIFIC EMBODIMENTS

Figure 1:
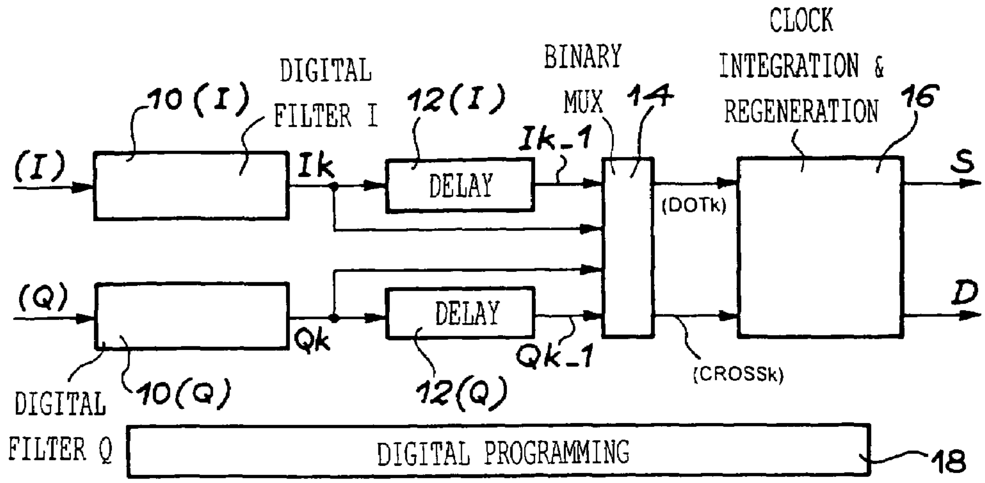
FIG. 1, already described, illustrates a known receiver.
Figure 2:
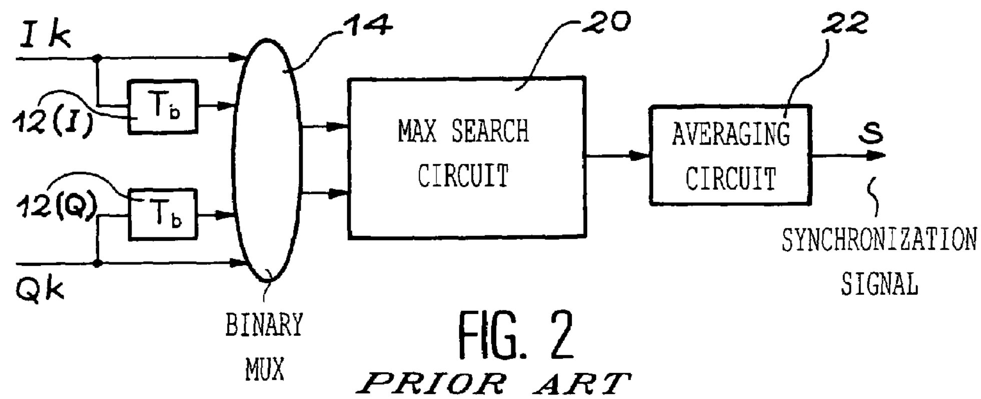
FIG. 2, already described, illustrates a specific embodiment of the synchronization means.
Figure 3:
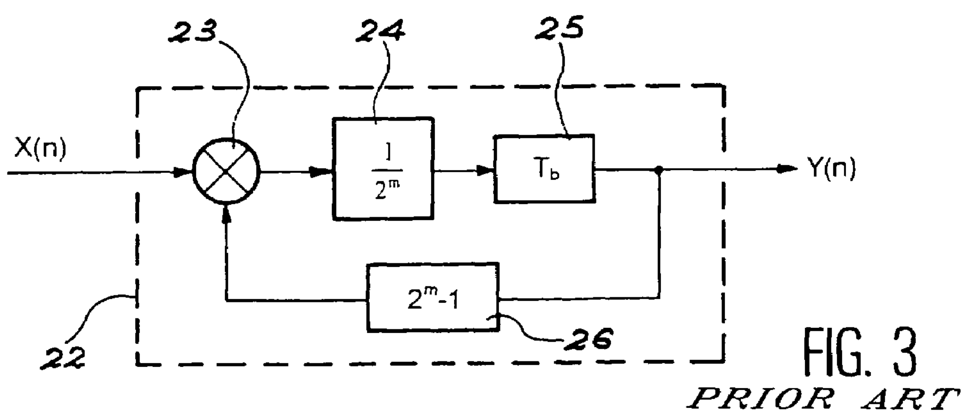
FIG. 3, already described, shows the principle of a signal averaging circuit.
Figure 4:
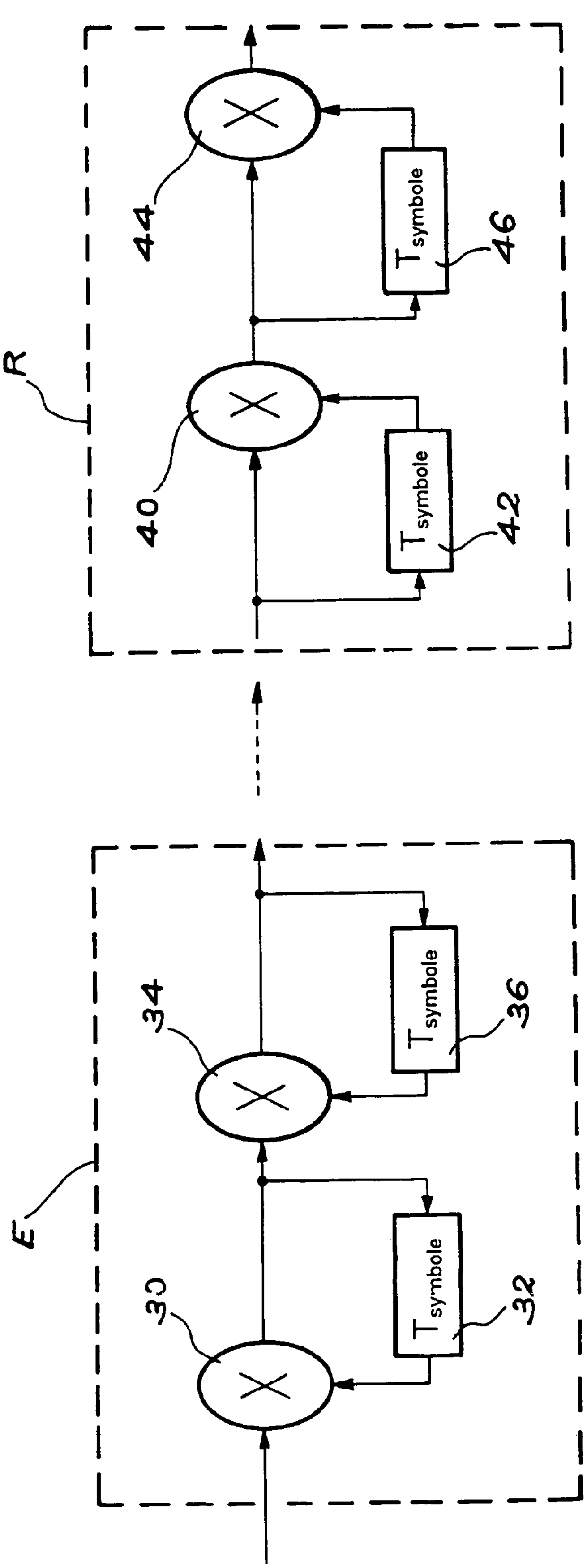
FIG. 4, already described, illustrates the principle of double differential detection used for encoding and decoding information data.
Figure 5:
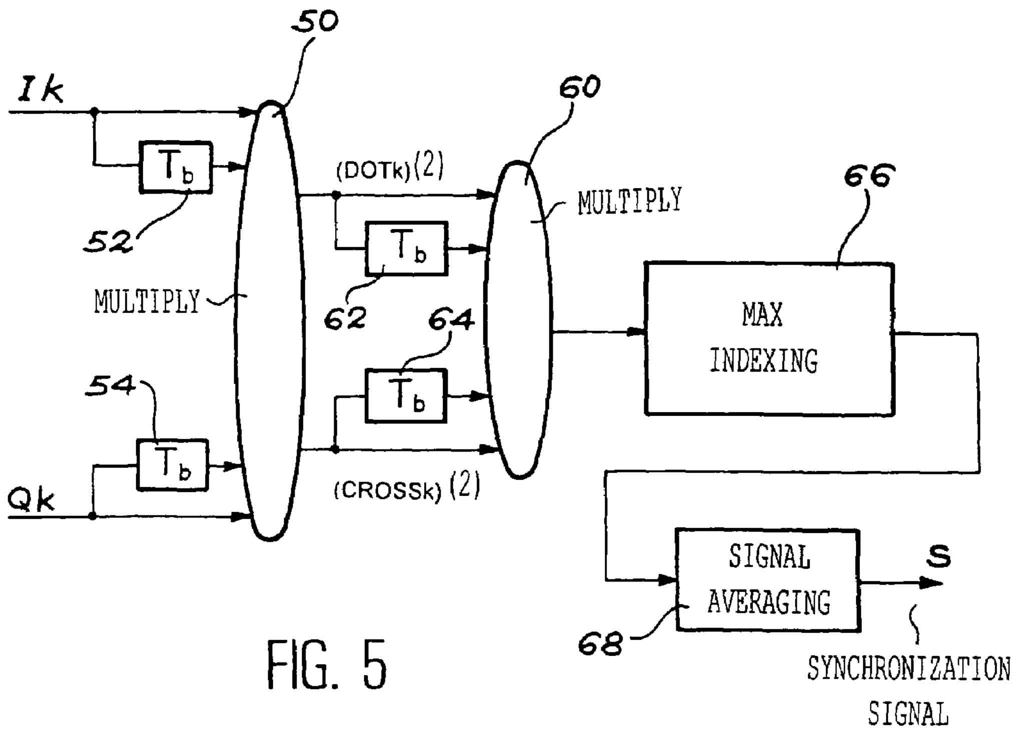
FIG. 5 schematically illustrates the double delayed multiplication method implemented in the invention.

FIG. 5 schematically illustrates the synchronization part of a receiver in accordance with the invention. The adapted filters (or correlators), the decoding means, etc. are not shown because they have already been described in FIG. 1. Furthermore, it is assumed that complex signals with a (phase, or real) component I and a (quadrature, or imaginary) component Q are processed.

The circuit of FIG. 5 receives samples $I_k$ and $Q_k$ indexed according to their rank k. Double delayed multiplication is obtained, on the one hand, by circuit 50 and delay circuits 52, 54, for the first delayed multiplication, and on the other hand, by circuit 60 and delay circuits 62, 64 for the second one. The represented circuit is completed with a maximum indexing circuit 66 and a signal averaging circuit 68.

The first multiplication allows the components $DOT_k^{(1)}$ and $CROSS_k^{(1)}$ to be obtained, which are defined by $$DOT_k^{(1)} = I_k I_{k-1} + Q_k Q_{k-1}$$

$$CROSS_k^{(1)} = I_{k-1} Q_k + I_k Q_{k-1}$$

The upper index (1) recalls that samples obtained after a first delayed multiplication are involved.

The second multiplication allows to obtain two further components, indicated by an upper index (2), i.e.:

$$DOT_k^{(2)} = DOT_k^{(1)} \cdot DOT_{(k-1)}^{(1)} + CROSS_k^{(1)} \cdot CROSS_{(k-1)}^{(1)}$$

$$CROSS_k^{(2)} = DOT_{(k-1)}^{(1)} \cdot CROSS_k^{(1)} - DOT_k^{(1)} \cdot CROSS_{(k-1)}^{(1)}$$

Synchronization according to the invention is performed on signals $DOT^{(2)}$ and $CROSS^{(2)}$.

In order to understand why double delayed multiplication provides an advantage in comparison with single multiplication, we have to return to the theory of spread spectrum digital communications using pseudo-random sequences and calculate the probability of peak detection.

A baseband signal corresponding to the message transmitted by the u-th user can be written as:

$$s_u(t) = \sqrt{P_u}\, b_u(t) a_u(t) e^{j\phi_u},$$

where:

$P_u$ is the energy received at the receiver;

$$b_u(t) = \sum_{i=0}^{M-1} b_{i,u} p_{T_b}(t - iT_b),$$

is data transmitted, where $b_{i,u}$ adopt the values +1 or −1, M being the number of bits contained in the block of information under consideration:

$$p_{T_b}(t) = \begin{cases} 1 & \text{if } t \text{ is in range } 0 - T_b \\ 0 & \text{if } t \text{ is outside this range} \end{cases}$$

$a_u(t)$ is the spread spectrum sequence, i.e.

$$a_u(t) = \sum_{i=0}^{M-1} \sum_{j=0}^{N-1} X_j^k P_{T_c}(t - jT_c - iT_b),$$

where $$N = \frac{T_b}{T_c}$$

is the processing gain or sequence length, $X_j^o$ adopts the values −1 or −1 and $T_c$ is the duration of a rectangular chip;

$\phi_u$ is a phase (with respect to a reference phase).

is data transmitted, where $b_{i,u}$ adopt the values +1 or −1, M being the number of bits contained in the block of information under consideration:

$$p_{T_b}(t) = \begin{cases} 1 & \text{if } t \text{ is in range } 0 - T_b \\ 0 & \text{if } t \text{ is outside this range} \end{cases}$$

$a_u(t)$ is the spread spectrum sequence, i.e.

$$a_u(t) = \sum_{i=0}^{M-1} \sum_{j=0}^{N-1} X_j^k P_{T_c}(t - jT_c - iT_b,$$

where $$N = \frac{T_b}{T_c}$$

is the processing gain or sequence length, $$X_j^0$$

adopts the values +1 or −1 and $T_c$ is the duration of a rectangular chip;

$\theta_u$ is a phase (with respect to a reference phase).

Because of system inherent asynchronism, the total signal received is written as:

$$r(t) = \sum_{u=1}^{U} S_u(t - \tau_u) + n(t,$$

where:

U is the number of users;

$\tau_u$, comprised in range (0, $T_b$), is the delay associated with the u-th user;

n(t) is a white gaussian noise with $$\frac{N_0}{2}$$

one-way power spectral density.

This conventional notation assumes:

no multiple tracks, no phase rotations during transmission (no fade-out or Doppler effect), channel invariance during transmission, infinite band channel (signals are perfectly rectangular).

The outputs of the filters adapted to U spread spectrum sequences are the components of a vector designated as $\bar{y}$.

The complex envelope of vector $\bar{y}$ is written as:

$$\bar{y} = \bar{y}_I \cos(\Theta) + \bar{y}_Q \sin(\Theta$$

The i-th output of the filter adapted to the u-th user is the ((i−1)U+u)-th element of this vector $\bar{y}$.

The quantity Θ is a UM ranked diagonal matrix, the elements of which are the phases associated with the i-th bit of the u-th user.

The phase and quadrature components of y are written as:

$$\begin{cases} y_{I_{(i-1)U+u}} = y_{i,u}^I = \int_{(i-1)T_b+\tau_u}^{iT_b+\tau_u} r_I(t) a_u(t - \tau_u) dt \\ y_{Q_{(i-1)U+u}} = y_{i,u}^Q = \int_{(i-1)T_b+\tau_u}^{iT_b+\tau_u} r_Q(t) a_u(t - \tau_u) dt \end{cases}$$

where $r_I(t)$=Re [r(t)] and $r_Q(t)$=Im[r(t)]. In matrix form, this can be written as:

$$\begin{cases} \bar{y}_I = RW \cos(\Theta)\bar{b} + \bar{n}_I \\ \bar{y}_Q = RW \cos(\Theta)\bar{b} + \bar{n}_Q \end{cases}$$

where:

R is a UM ranked square matrix:

$$R = \begin{pmatrix} R(0) & R(1) & & O & \\ R(-1) & R(0) & R(1) & & \\ & R(-1) & R(0) & \ddots & \\ & & \ddots & \ddots & R(1) \\ & O & & R(-1) & R(0) \end{pmatrix}$$

The (u,l)-th element of the square matrix of rank K, R(i) is:

$$\rho_{u,l}(i) = \int_{-\infty}^{+\infty} a_u(t-\tau_u)a_l(t^0 iT_b - \tau_l)dt$$

W is a UM ranked diagonal matrix, the elements of which are the square roots of the powers received, and defined in the same way as Θ;

$\bar{b}$ is a UM sized vector, the j-th element (j=(i−1)U+u) of which is the i-th symbol transmitted by the u-th user, $\bar{n}_I$ and $\bar{n}_Q$ are color noise vectors.

If $\tau_1<\tau_2< \ldots <\tau_U$, then R(1) is an upper triangular matrix with zero diagonal, $R(-1)=R(1)^T$ where T is a translation, and R(i)=0, whatever |i|>1. This non restrictive hypothesis does by no means degrade the generalization of the proposed notation.

We are now considering the outputs of the correlation in a time window having the same duration as the bit duration. Except for the peaks, the signals at these outputs are written as:

$$\int_0^{T_b} r_1(t)a_u(t-nT_c)dt = r_{u,n},$$

(r for real part, channel I).

This notation can be simplified as $r_u$ (respectively $i_u$ for the imaginary part of channel Q) to designate the correlation outputs on channels I and Q, for a time window $T_b$.

Figure 6:
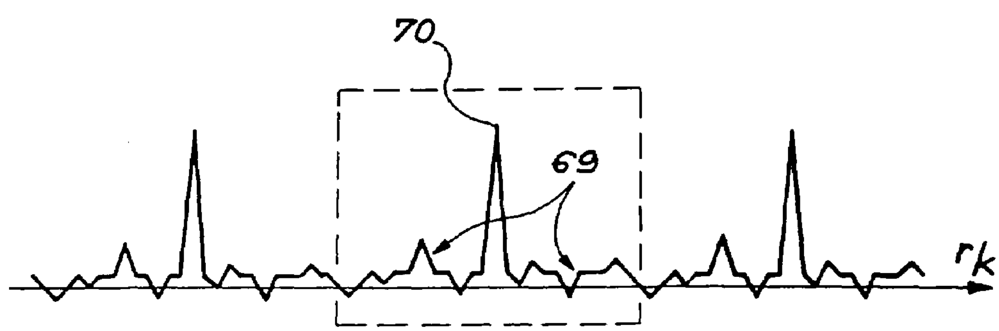
FIG. 6 shows the appearance of a processed signal.

FIG. 6 shows the appearance of signal $r_r$ with a background 69 and a peak 70, the dashed frame symbolizing the time window corresponding to one data bit. If these outputs do not contain any signal (except for the peak), $r_r$ and $i_u$ can be modeled using gaussian zero average methods, and probabilities can be written as:

$$\begin{cases} p(r_u) = \dfrac{1}{\sqrt{2\pi\sigma}} \dfrac{r_u^2}{2\sigma^2} \\ p(i_u) = \dfrac{1}{\sqrt{2\pi\sigma}} \dfrac{i_u^2}{2\sigma^2} \end{cases}$$

where:

$$\sigma^2 = \sigma_{N_0}^2 + \frac{U-1}{3N}$$

for asynchronous transmissions. For the scenarios considered in the invention, $\sigma_{N_o}^{\;2}$ is much less than $$\frac{U-1}{3N},$$

so that $$\sigma^2 \approx \frac{U-1}{3N}.$$

After differential demodulation, synchronization can be considered as square-law detection, where the sum of squares $r_u^{\;2}+i_u^{\;2}$ is determined (strictly speaking, $r_{u,n}r_{u,n-N}+i_{u,n}i_{u,n-N}$ is calculated, but the exponent can be simplified by taking $r_u^{\;2}+i_u^{\;2}$). This quantity is the square of the amplitude $A_k$ of the vector of components $r_u$, $i_u$:

$$A_u^{\;2}=r_u^{\;2}+i_u^{\;2}$$

An angle $\phi_u$, such as:

$$\begin{cases} r_u = A_u\cos(\phi_u) \\ i_u = A_u\sin(\phi_u) \end{cases}$$

can be defined.

If $p(r_u, i_u)$ and $q(A_u, \phi_u)$ designate the common probabilities relating to $(r_u, i_u)$ and $(A_u, \phi_u)$:

$$p(r_u, i_u)dr_u di_u = \frac{1}{2\pi\sigma^2}e^{-\frac{r_u^2+i_u^2}{2\sigma^2}}dr_u di_u = \frac{1}{2\pi\sigma^2}e^{-\frac{A_u^2}{2\sigma^2}}dr_u di_u = q(A_u, \phi_u)dA_u df_u$$

is obtained.

Figure 7:
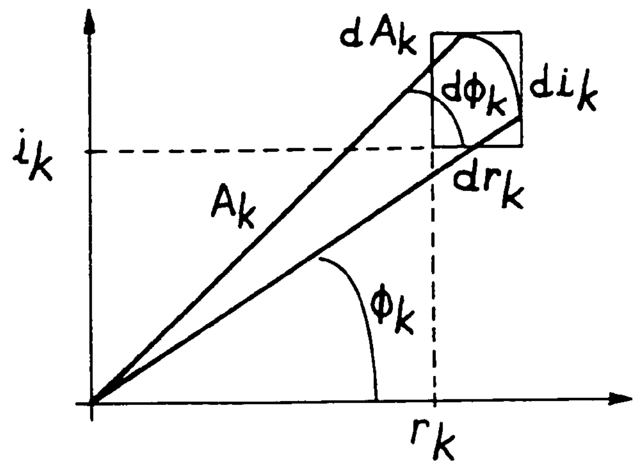
FIG. 7 is a diagram showing the relationships existing between various differential quantities.

The Cartesian differential elements $dr_u$ and $di_u$ are related to the polar differential elements $dA_u$, $d\phi_u$ according to the diagram of FIG. 7. The area of the rectangle is $dr_u \cdot di_u$ and the area of the circular segment is $(A_u d\phi_u)\, dA_u$. It can be considered that these two surfaces are substantially equal and:

$$dr_u di_u=(A_u d\phi_u dA_u$$

can be written, leading to:

$$q(A_u, \phi_u) = \frac{A_u}{2\pi\sigma^2}e^{-\frac{A_u^2}{2\sigma^2}}.$$

$A_u$ and $\phi_u$ are thus decorrelated and:

$$\begin{cases} q(\phi_u) = \dfrac{1}{2\pi} \\ q(A_u) = \dfrac{A_u}{\sigma^2} e^{-\frac{A_u^2}{2\sigma^2}} \end{cases}$$

If the correlation outputs contain a signal corresponding to the correlation peaks, their averages $m_{r_u}$ and $m_{i_u}$ are no longer zero and the probabilities (written with a dash) are now:

$$\overline{p}(r_u, i_u) = \frac{1}{2\pi\sigma^2} e^{-\frac{(r_u - m_u)^2 + (i_u - m_u)^2}{2\sigma^2}} =$$

$$\frac{1}{2\pi\sigma^2} e^{-\frac{A_u^2}{2\sigma^2} - \frac{m_{r_u}^2 + m_{i_u}^2 - 2r_u m_{r_u} - 2i_u m_{i_u}}{2\sigma^2}} = \overline{q}(A_u, \phi_u) dA_u d\phi_u$$

and there are two quantities $S_u$ and $\theta_u$ such as:

$$\begin{cases} m_{r_u} = S_u \cos(\theta_u) \\ m_{u_u} = S_u \sin(\theta_u) \end{cases} \cdot \overline{q}(A_u) =$$

$$\int_{\phi_u=0}^{2\pi} \frac{1}{2\pi\sigma^2} e^{-\frac{A_u^{2\phi}}{2\sigma^2} - \frac{S_u^2 - 2A_u S_u \cos(\phi_u \theta_u)}{2\sigma_2}} d\phi_u = \frac{1}{\pi\sigma^2} e^{-\frac{A_u^2 + S_u^2}{2\sigma^2}} I_0\left(\frac{A_u S_u}{\sigma^2}\right)$$

is obtained, where $I_0$ designates the zero order Bessel function.

The probability of correct correlation peak detection is then:

$$P^{(1)} = \int_{\Re} q(A_u) \left( \int_{x=A_u}^{+\infty} \overline{q}(x) dx \right) dA_u$$

$$\text{i.e.,} \quad P^{(1)} = \int_{\Re} \frac{A_u e^{-\frac{A_u^2 + S_u^2}{2\sigma^2}}}{\pi\sigma^2} \left( \int_{A_u}^{+\infty} e^{-\frac{x^2}{2\sigma^2}} I_0\left(\frac{x S_u}{\sigma^2}\right) dx \right) dA_u$$

This calculation is valid for a single delayed multiplication, which explains the upper index (1) affecting P. It can be extended to the case of double delayed multiplication, and in general to the case of n delayed multiplications. The expressions then are:

$$A_u^2 = r_u^2 + i_u^n$$

$$\begin{cases} r_u^{(n)} = A_u^{2^{n-1}} \cos(\phi_u) \\ i_u^{(n)} = A_u^{2^{n-1}} \sin(\phi_u) \end{cases}$$

Probability is then expressed as:

$$\begin{cases} m_{r_u^{(n)}} = S_u^{2^{n-1}} \cos(\theta_u \\ m_{i_u^{(n)}} = S_u^{2^{n-1}} \sin(\theta_u \end{cases}$$

-continued $$P^{(n)} = \int_{\Re'} \frac{A_u e^{-\frac{A_u^{2^n} + S_u^{2^n}}{2\sigma^2}}}{2^{n-1}\pi\sigma^4} \left( \int_{(A_u)2^{n^1-1}}^{+\infty} e^{-\frac{x^2}{2\sigma^2}} (x) 2^{\frac{1}{n-1}-1} I_0\left(\frac{x(S_u)2^{n-1}}{\sigma^2}\right) dx \right) dA_u$$

The question is now whether this probability $p^{(n)}$ of correct peak detection increases when n (i.e., the number of delayed multiplications) is greater than 1.

The applicant has calculated this probability for the case of U=5 users, N=63 (sequences with 63 chips), and $S_u$=1. The results are grouped in the following table:

| n | $P^{(n)}$ |
|---|---|
| 1 | 0, 32 |
| 2 | 0, 69 |
| 3 | 0, 67 |
| 4 | 0, 34 |
| 5 | 0, 18 |

It appears that synchronization based on a double delayed multiplication is more reliable than conventional synchronization. On the other hand, increasing n beyond 2 does not modify anything other than increasing hardware complexity.

Figure 8:
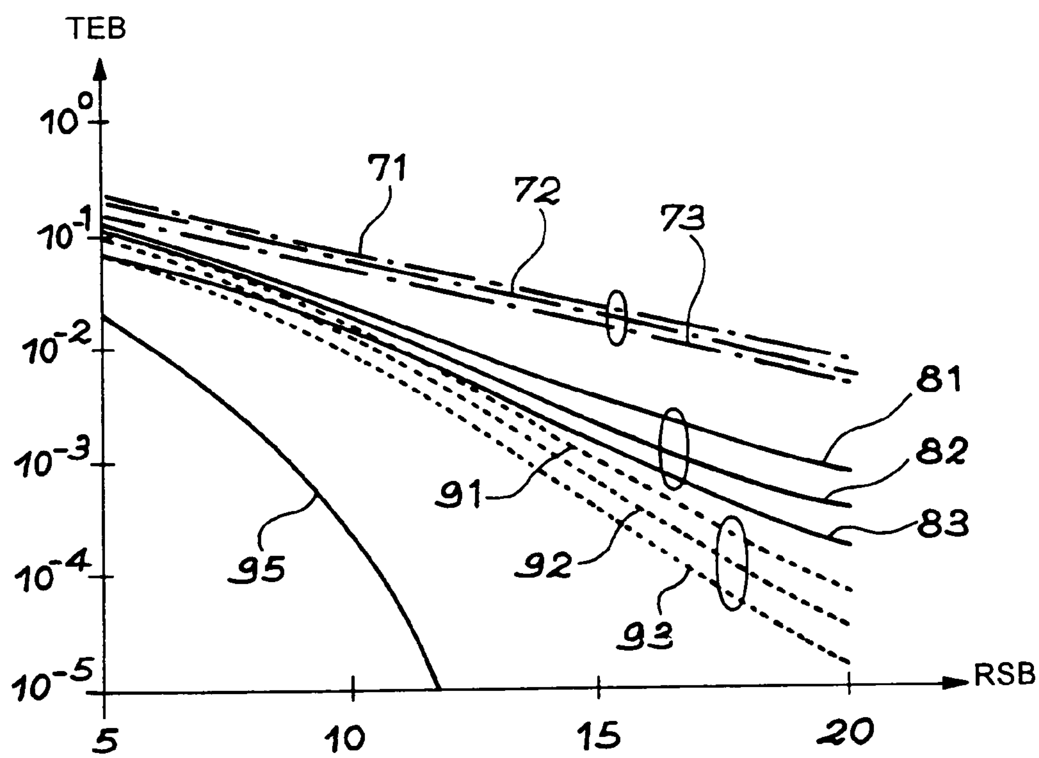
FIG. 8 comparatively illustrates the performance of a receiver in accordance with the invention.

The curves of FIG. 8 enable a comparison between the performance obtained with the invention and that of conventional techniques. They show an evolution of the bit error rate (BER) as a function of the signal to noise ratio (SNR). In this figure:

- the three curves 71, 72, 73 correspond to a receiver having no stage for multiple access parallel interference suppression; curve 71 corresponds to prior art (single delayed multiplication), curve 72 corresponds to the invention (two delayed multiplications), and curve 73 is an ideal curve;
- the three curves 81, 82, 83 correspond to a receiver having a single stage for parallel interference suppression, with the same three respective scenarios (single delayed multiplication, double delayed multiplication, ideal);
- the three curves 91, 92, 93 correspond to a receiver with two stages for parallel interference suppression with the same three successive scenarios;
- curve 95 corresponds to the ideal theoretical case.

These results show the interest of double delayed multiplication for synchronization. This operation is hardly more expensive than single delayed multiplication, except that it has to be duplicated for each channel. On the other hand, synchronization is greatly improved, enabling better retrieval and better estimates at each parallel interference suppression stage.

What is claimed is:

1. A method for receiving a CDMA signal, comprising an operation of correlation with appropriate pseudo-random sequences, an operation of synchronization for locating data in the correlation signal obtained, and an operation of retrieving data, this method further comprising:

the synchronization operation comprising implementing double delayed multiplication of the sampled correlation signal by performing a first delayed multiplication comprising multiplying a sample of the correlation signal by the conjugate preceding sample, then implementing a second delayed multiplication comprising multiplying a sample of the signal thus obtained by the conjugate preceding sample of said signal obtained, wherein, the correlation signal is a complex signal with a real component $I_k$ and an imaginary component $Q_k$, the signal obtained after the first delayed multiplication is in turn complex having a real component $(DOT^{(1)}_k)$ and an imaginary component $(CROSS^{(1)}_k)$:

wherein for performing the first delayed multiplication, the quantity $I_k I_{k-1}+Q_k Q_{k-1}$ is calculated, supplying the real component $(DOT^{(1)}_k)$ of the new signal, the quantity $Q_k I_{k-1}-I_k Q_{k-1}$ is calculated, supplying the component $CROSS^{(1)}_k$ of the new signal, and wherein for performing the second delayed multiplication, the quantity $(DOT^{(1)}_k)(DOT^{(1)}_{k-1})+(CROSS^{(1)}_k)(CROSS^{(1)}_{k-1})$ is calculated, giving the real component $(DOT^{(2)}_k)$ the final signal, and the quantity $(DOT^{(1)}_{k-1})(CROSS^{(1)}_k)-DOT^{(1)}_k(CROSS^{(1)}_{k-1})$ is calculated, giving the imaginary component $(CROSS^{(2)}_k)$ of the final signal.

2. The method according to claim 1, wherein a maximum of the signal obtained through double delayed multiplication is searched for, and a synchronization signal corresponding to said maximum is delivered.

3. The method according to claim 2, wherein an average is calculated of two successive maximum values obtained before the synchronization signal is generated.

4. A CDMA signal receiver for implementing the method according to claim 1, this receiver comprising:

correlation means functioning with appropriate pseudo-random sequences, and delivering a sampled correlation signal, synchronization means (16) for delivering a synchronization signal localizing data within the correlation signal, decoding means for retrieving the data, the synchronization means comprising a double delayed multiplication means of the sampled correlation signal comprising means capable of performing a first delayed multiplication comprising multiplying a sample of the correlation signal by the conjugate preceding sample, then a second delayed multiplication comprising multiplying a sample of the signal thus obtained by the conjugate preceding sample of said signal obtained.

* * * * *